N. F. HERSH.
Rat-Trap.
No. 104,031.
Patented June 7, 1870.
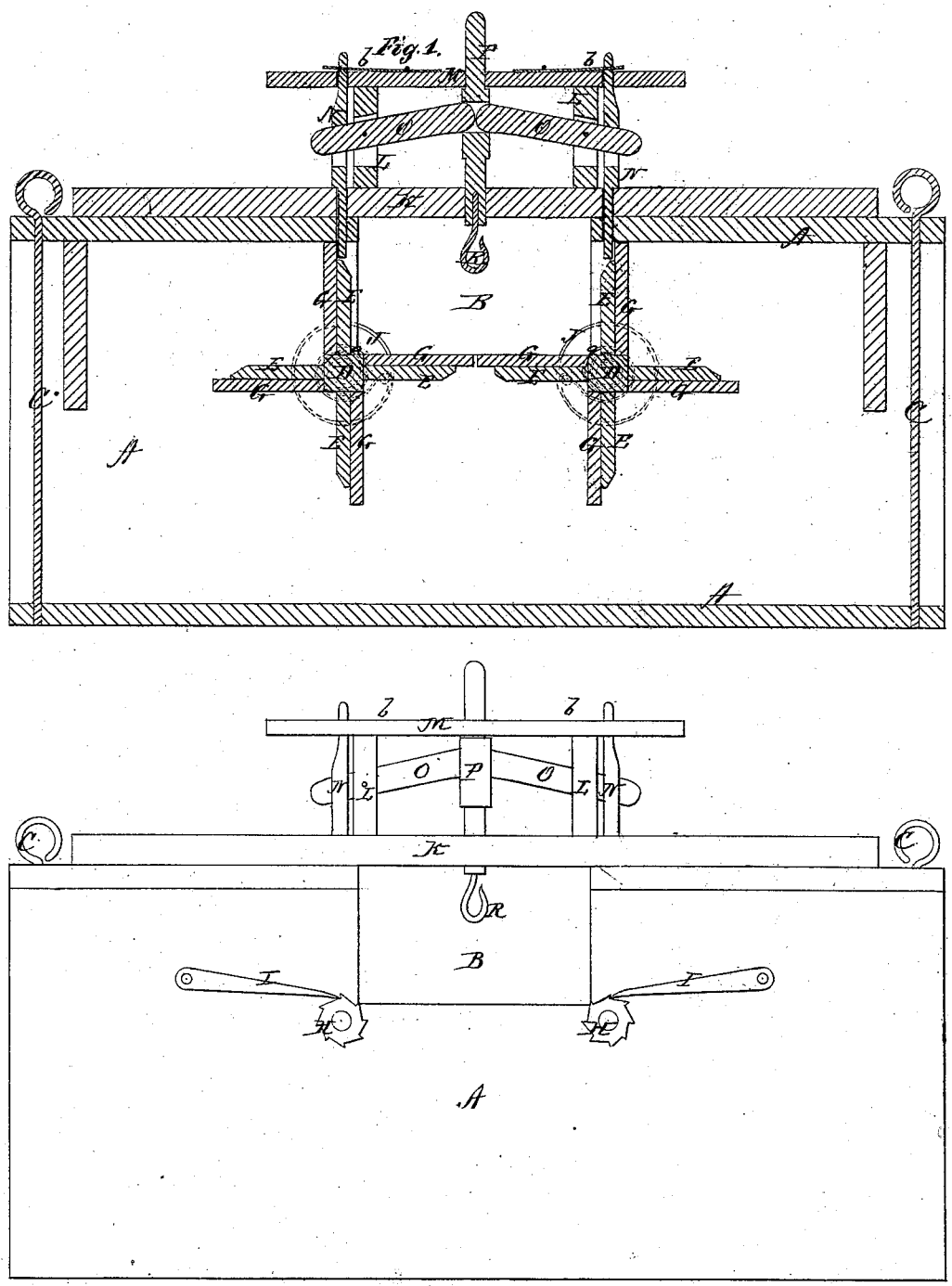

United States Patent Office.

NOAH F. HERSH, OF ROUND HILL, ASSIGNOR TO HIMSELF AND A. B. LEREW, OF YORK SULPHUR SPRINGS, PENNSYLVANIA.

*Letters Patent No. 104,031, dated June 7, 1870.*

IMPROVED ANIMAL-TRAP.

The Schedule referred to in these Letters Patent and making part of the same.

*To all whom it may concern:*

Be it known that I, NOAH F. HERSH, of Round Hill, in the county of Adams and State of Pennsylvania, have invented certain new and useful Improvements in Animal-Traps; and I do hereby declare that the following is a full, clear, and exact description thereof, reference being had to the accompanying drawings and to the letters of reference marked thereon, which form a part of this specification.

The nature of my invention consists in the construction and general arrangement of a "rat-trap," as will be hereinafter fully set forth.

In order to enable others skilled in the art to which my invention appertains to make and use the same, I will now proceed to describe its construction and operation, referring to the annexed drawings, in which—

Figure 1 is a longitudinal vertical section, and

Figure 2 is a side elevation of my improved trap.

A represents a box of any desired dimensions, having an opening, B, across the center, and its ends closed by means of upright wires C C, some of which are removable, for the purpose of letting out the rat or other animal caught in the same.

On each side of the opening B, in the sides of the box A, is pivoted a shaft, D, running across the box, and from all four sides of said shaft or bar extend arms E E, upon which are laid boards G in such a manner as to close up, when set in position, the bottom and sides of the opening B, as shown in fig. 1.

The pivots of the bars D D pass entirely through the sides of the box A, and those on one side are provided with toothed wheels H H, in which pawls I I are fitted, as shown in fig. 2, so as to prevent the bars D D from turning in the wrong direction; that is, turning the boards G G, which are in a horizontal position, closing the opening B, upward, they must turn downward into the box.

The pivots on the other side of the box are provided with coil-springs a a, inclosed in metal casings J J, as shown in fig. 1, and said springs are so arranged that, when the revolving wheels D E G are turned in what I call the wrong direction, as above explained, the springs will be wound up and cause said wheels to turn in the right direction. When the spring, are being thus wound up, it is, of course, understood that the pawls I I must be lifted out of the toothed wheels H H.

The wheels, or, rather, revolving trap-doors D E G, are prevented from turning by the following means:

In the center, on top of the box A, running longitudinally, is a bar, K, upon which are two slotted standards, L L, connected at their upper ends by means of a bar, M.

Through slots in said bars M and K, and in the inner edges of the box, are passed vertical bars N N, the lower ends of which are immediately in front of the upper vertical boards G G, thus preventing the same from turning downward and forward, as would be the tendency of the springs a a, as already mentioned.

The vertical bars N N are held down in this position by means of springs b b on the horizontal bar M.

In the slotted standards L L are pivoted levers O O, the outer ends of which pass through slots or mortises in the bars N N, while their inner ends are pivoted to a bar, P, which moves vertically through slots in the center of the bars M and K, and is, at its lower end, provided with a hook, R, upon which the bait is placed, said hook being in the center of the opening B.

The trap being set in the manner indicated, when a rat or other animal attempts to remove the bait from the hook R, it will lower the bar P, which raises the bars N N, when the revolving trap-doors are at once thrown down by the action of the springs a a, precipitating the animal into the box.

When the strain is thus removed from the bar P, the springs b b at once throw the bars or latches N N down again, stopping the revolution of the trap-doors, and the trap is set again of itself. It is thus a complete self-setting animal-trap.

Having thus fully described my invention,

What I claim as new, and desire to secure by Letters Patent, is—

The combination of the box A with opening B, revolving trap-doors D E G, springs a a, latches N N, springs b b, levers O O, central bar P, and hook R, all constructed and arranged to operate substantially in the manner and for the purposes herein set forth.

In testimony that I claim the foregoing as my own, I affix my signature in presence of two witnesses.

NOAH F. HERSH.

Witnesses:
 B. W. BIEGLER,
 S. J. KOONTZ.